(12) United States Patent
Aguilar et al.

(10) Patent No.: US 12,638,077 B1
(45) Date of Patent: May 26, 2026

(54) PLANET GEAR CARRIER ASSEMBLY

(71) Applicant: Schaeffler Technologies AG & Co. KG, Herzogenaurach (DE)

(72) Inventors: Sergio Enrique Aguilar, San Pedro Cholula (MX); Jesus Maus, Puebla pue (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/193,255

(22) Filed: Apr. 29, 2025

(51) Int. Cl.
*F16H 57/08* (2006.01)
*F16H 1/28* (2006.01)
*F16H 57/031* (2012.01)

(52) U.S. Cl.
CPC ............. *F16H 57/082* (2013.01); *F16H 1/28* (2013.01); *F16H 57/031* (2013.01); *F16H 2057/085* (2013.01)

(58) Field of Classification Search
CPC . F16H 57/082; F16H 57/031; F16H 2057/085
See application file for complete search history.

(56) References Cited

U.S. PATENT DOCUMENTS

| | | | | |
|---|---|---|---|---|
| 5,098,358 A | * | 3/1992 | Igaku | F16H 57/02004 74/DIG. 10 |
| 5,470,286 A | * | 11/1995 | Fan | F16H 57/082 475/331 |
| 11,346,440 B1 | * | 5/2022 | Lee | F16H 1/32 |
| 2004/0023749 A1 | * | 2/2004 | Zelikov | F16H 57/082 475/331 |
| 2012/0272525 A1 | * | 11/2012 | Basin | B23P 15/14 29/893.1 |
| 2019/0285142 A1 | * | 9/2019 | Kirchgeßner | F16H 1/28 |
| 2020/0263613 A1 | * | 8/2020 | Simon | F16H 57/043 |
| 2021/0404534 A1 | * | 12/2021 | Tsuchida | F16H 57/0426 |
| 2022/0307583 A1 | * | 9/2022 | Hisai | F16H 1/46 |
| 2023/0044768 A1 | * | 2/2023 | Hilty | B23K 26/21 |

FOREIGN PATENT DOCUMENTS

| | | |
|---|---|---|
| DE | 102019129237 A1 | 10/2020 |
| DE | 102019112766 A1 | 11/2020 |
| DE | 102019113882 A1 | 11/2020 |

* cited by examiner

*Primary Examiner* — Farhana Pervin
(74) *Attorney, Agent, or Firm* — Suiter Swantz IP

(57) ABSTRACT

A planet gear carrier assembly includes a base having a plurality of twist lock receivers arranged in a ring pattern, and a planet gear carrier including a plate having a plurality of axially extending arms corresponding in number and position to the plurality of twist lock receivers. The plurality of axially extending arms are configured to twist lock engage in the plurality of twist lock receivers to removably mount the planet gear carrier to the base. In embodiments, the base may be constructed from die-casted aluminum and the planet gear carrier may be constructed from stamped steel. The planet gear carrier assembly may be utilized in a gearbox or other application.

18 Claims, 6 Drawing Sheets

PLANET GEAR CARRIER ASSEMBLY

TECHNICAL FIELD

The present disclosure generally relates to a planetary gearset, and more particularly, to a planet gear carrier assembly.

BACKGROUND

Planetary gearsets are used in various applications requiring mechanical power transfer, gear reduction, etc. Typical planetary gearsets include a sun gear, a ring gear, a plurality of planet gears meshed with the sun and ring gears, and a planet gear carrier. Gears may be spur or helical depending on application. In fixed planet gear carrier applications, mechanical power may be transferred from the driven sun gear to the ring gear through the planet gears.

Traditional planet gear carriers utilized in electric vehicle drivetrains are typically one-piece aluminum die-casted components due to their lightweight properties and good strength-to-weight ratio. However, the manufacturing process for aluminum die-casted components necessitates the use of sliders and molds, which can complicate production. These molds not only incur significant initial costs but also require regular maintenance and potential replacement over time, adding to the overall expense of production. In addition, the complexity of a multi-faceted approach to design and manufacturing using aluminum die-casted components leads to longer development times and increased investment in engineering resources, ultimately impacting the overall feasibility and market competitiveness of products relying on aluminum die-casted technology.

SUMMARY

According to one aspect, the present disclosure provides a planet gear carrier assembly including a base having a plurality of twist lock receivers arranged in a ring pattern, and a planet gear carrier including a plate having a plurality of axially extending arms corresponding in number and position to the plurality of twist lock receivers, the plurality of axially extending arms configured to twist lock engage in the plurality of twist lock receivers to removably mount the planet gear carrier to the base.

In some embodiments, the base may be constructed from die-casted aluminum and the planet gear carrier may be constructed from stamped metal such as steel.

In some embodiments, the plurality of twist lock receivers may be spaced equidistant relative to each other and relative to a central axis of the planet gear carrier assembly, and the plurality of axially extending arms may be spaced equidistant relative to each other and relative to the central axis of the planet gear carrier assembly.

In some embodiments, the base and the planet gear carrier may each include a plurality of through holes configured to receive planet gear mounting pins, wherein each through hole of the base may be positioned between two of the plurality of twist lock receivers and each through hole of the planet gear carrier may be positioned equidistant between two of the plurality of axially extending arms.

In some embodiments, each twist lock receiver may include a first portion configured to axially receive one of the plurality of axially extending arms, and a second portion configured to axially and rotationally constrain the received one of the plurality of axially extending arms.

In some embodiments, the second portion may be continuous with the first portion and includes an undercut forming a lateral overhang.

In some embodiments, each axially extending arm may terminate in a lateral portion configured to interface with the lateral overhang to constrain axial motion of the planet gear carrier relative to the base.

In some embodiments, the base may include a sun gear groove formed between a pair of concentric and axially extending annular bosses configured to provide clearance for a sun gear, and a ring gear groove formed between axially extending portions of the base configured to provide clearance for a ring gear, wherein the ring gear groove may be positioned on the base radially outward relative to the sun gear groove.

In some embodiments, the assembly may further include a plurality of planet gear mounting pins mounted between the base and the planet gear carrier, and a plurality of planet gears rotatably mounted on the plurality of planet gear mounting pins.

According to another aspect, the present disclosure provides a planet gear carrier assembly including a base having a plurality of twist lock receivers arranged in a ring pattern, a planet gear carrier removably mounted to the base, the planet gear carrier including a plate having a plurality of axially extending arms corresponding in number and position to the plurality of twist lock receivers, and the plurality of axially extending arms twist lock engaged with the plurality of twist lock receivers, a plurality of planet gear mounting pins mounted to and extending between the base and the planet gear carrier, and a plurality of planet gears rotatably mounted on the plurality of planet gear mounting pins.

According to a further aspect, the present disclosure provides a gearbox including a housing, a sun gear disposed in the housing, a ring gear disposed in the housing, and a planet gear carrier assembly. In embodiments, the planet gear carrier assembly includes a cover mounted to the housing and including a plurality of twist lock receivers arranged in a ring pattern, and a planet gear carrier disposed in the housing and removably mounted to the cover, the planet gear carrier including a plate having a plurality of axially extending arms corresponding in number and position to the plurality of twist lock receivers, and the plurality of axially extending arms twist lock engaged in the plurality of twist lock receivers, a plurality of planet gear mounting pins mounted to and extending between the cover and the planet gear carrier, and a plurality of planet gears rotatably mounted on the plurality of planet gear mounting pins, each planet gear meshed with the sun gear and the ring gear.

BRIEF DESCRIPTION OF THE DRAWINGS

The numerous advantages of the disclosure may be better understood by those skilled in the art by reference to the accompanying figures in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are generally directed to planet gear carrier assemblies, methods for assembling planet gear carrier assemblies, and applications such as electrical drivetrains including planetary gearsets. In embodiments, planet gear carrier assemblies disclosed herein include a two-piece construction whereby a first component (e.g., base or cover component) can be manufactured from die-casted aluminum and a second separate component (e.g., planet gear carrier) can be manufactured from stamped metal or other material. By providing a two-piece planet gear carrier assembly, the costs and complexities associated with a singular die-casted planet gear carrier can be avoided, among other advantages.

Figure 1:
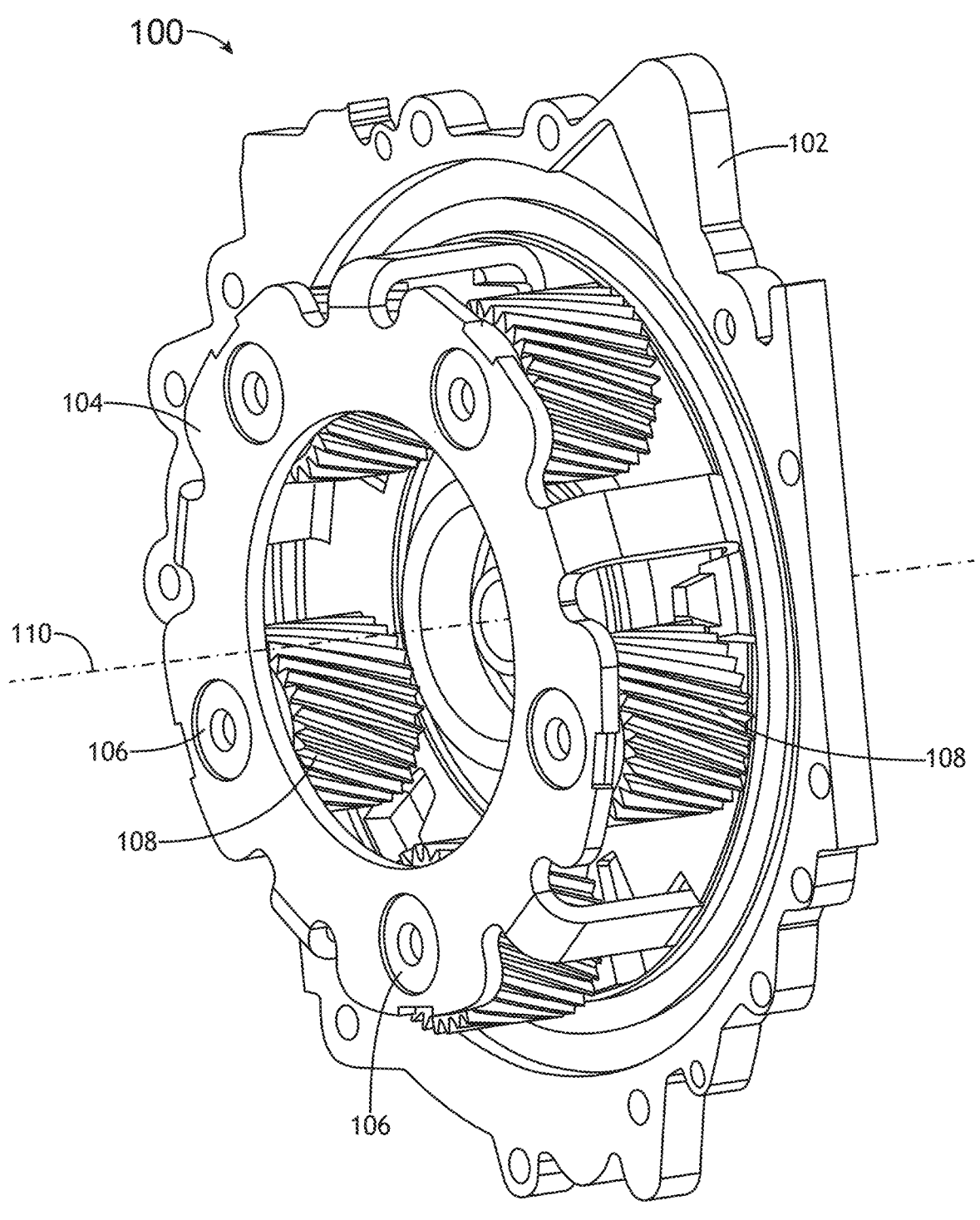
FIG. 1 depicts a perspective view of a planet gear carrier assembly in an assembled state, in accordance with one or more embodiments of the present disclosure.

FIG. 1 depicts a planet gear carrier assembly 100 according to an embodiments of the present disclosure. In embodiments, the planet gear carrier assembly 100 may be utilized in an electric vehicle drivetrain, gearbox, etc. In embodiments, the planet gear carrier assembly 100 generally includes a base 102 that may be die-casted, a planet gear carrier 104, a plurality of planet gear mounting pins 106, and a plurality of planet gears 108 each rotatably mounted on one of the planet gear mounting pins 106. In embodiments, the planet gears 108 may be mounted on bearings (not shown) mounted on the planet gear mounting pins 106. In embodiments, the planet gears 108 may be helical gears as shown, or other gear types such as spur gears.

The number and arrangement of planet gears 108 shown is illustrative and not intended to be limiting. For example, the embodiment shown includes five planet gears 108 arranged in a regular pentagon pattern. Other arrangements may include triangular, square, hexagonal, heptagonal, and other regular polygon patterns, and in some cases a singular planet gear or diametrically opposed pairs of planet gears, depending on the application. In embodiments, the planet gears 108 may be spaced equidistant relative to each other and relative to a center axis 110 of the planet gear carrier assembly 100. In embodiments, the planet gear carrier assembly 100 may be part of a planetary gearset including an inner sun gear (not shown) and outer ring gear (not shown) configured to rotate about the center axis 110, wherein the plurality of planet gears 108 are meshed with the sun and ring gears to transfer mechanical power.

Figure 2:
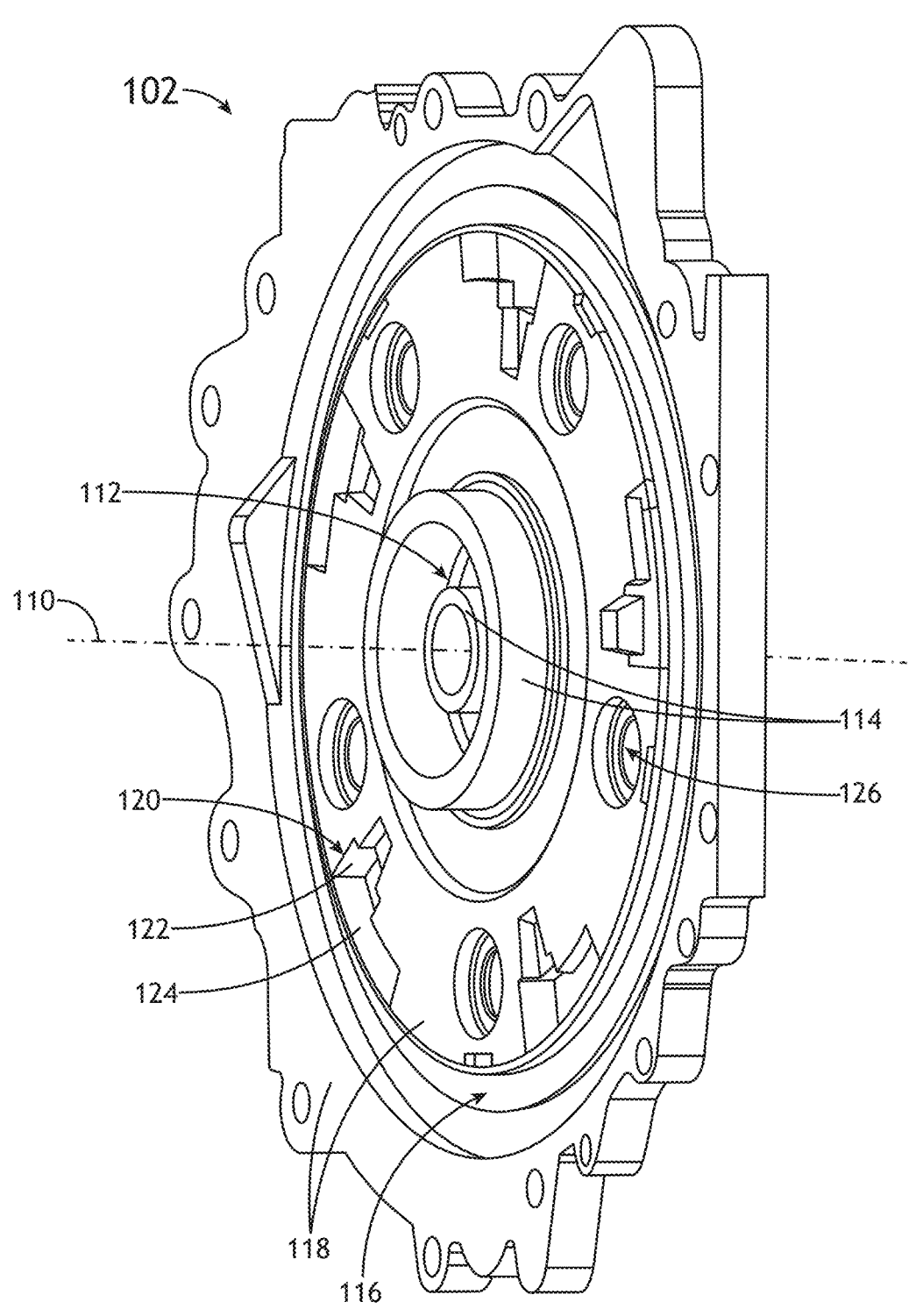
FIG. 2 depicts a perspective view of a die-casted base of the planet gear carrier assembly, in accordance with one or more embodiments of the present disclosure.

FIG. 2 depicts a non-limiting example of the base 102. In embodiments, the base 102 may be implemented as a cover, for example, configured to mount to a housing of a gear box using one or more fasteners, for instance a pattern of fasteners. In embodiments, the base 102 may be constructed from die-casted aluminum or other material. As shown, the base 102 may be integrally formed and may include a sun gear groove 112 disposed between concentric and axially extending annular bosses 114, and a ring gear groove 116 may be disposed between axially extending portions 118 of the base 102. In use, the sun gear groove 112 may provide clearance for the rotating sun gear and the ring gear groove 116 may provide clearance for the rotating ring gear and/or a housing to which the base 102 is mounted.

In embodiments, the base 102 may further include a plurality of twist lock receivers 120 arranged in a ring pattern and disposed between the sun gear groove 112 and the ring gear groove 116. As shown, in a non-limiting example, the base 102 may include five twist lock receivers 120 configured to receive and lock in place five corresponding axially extending arms of the planet gear carrier 104, as discussed in detail below. In embodiments, each twist lock receiver 120 may include a first portion 122 for receiving, in an axial direction, a terminal end of one of the respective axially extending arms, and a second portion 124 for constraining axial and rotational motion of the axially extending arm when fully engaged in the twist lock receiver 120.

The first and second portions 122, 124 may be disposed laterally adjacent and may be continuously formed such that the terminal ends of the axially extending arms may be simultaneously received in their respective first portions 122 and the planet gear carrier 104 may then be subsequently rotated (e.g., counterclockwise) to lock the axially extending arms in place in their respective second portions 124. Likewise, to simultaneously release the axially extending arms from their respective twist lock receivers 120, the planet gear carrier 104 may be rotated in a direction opposite the locking direction (e.g., clockwise) to move the axially extending arms from their respective second portions 124 to their respective first portions 120 and subsequently moving the planet gear carrier 104 in the axial direction away from the base 102 to separate the planet gear carrier 104 from the base 102.

In embodiments, the plurality of twist lock receivers 120 may be spaced equidistant relative to each other and relative to the center axis 110. In embodiments, the base 102 may further include a plurality of through holes 126 configured to receive one end of the planet gear mounting pins 106. As shown, five through holes 126 may be provided corresponding to the five planet gear mounting pins 106 and respective five planet gears 108 shown in FIG. 1. In embodiments, each through hole 126 may be positioned between two adjacent twist lock receivers 120 thereby forming a ring pattern of alternating through holes 126 and twist lock receivers 120. The number of through holes 126 may be dependent on the number of planet gears 108, and the number of twist lock receivers 120 may correspond to the number of axially extending arms provided on the planet gear carrier 104. Although not shown, in an elective drive application, the reverse side of the base 102 may include oil routing features.

5

6

Figure 3:
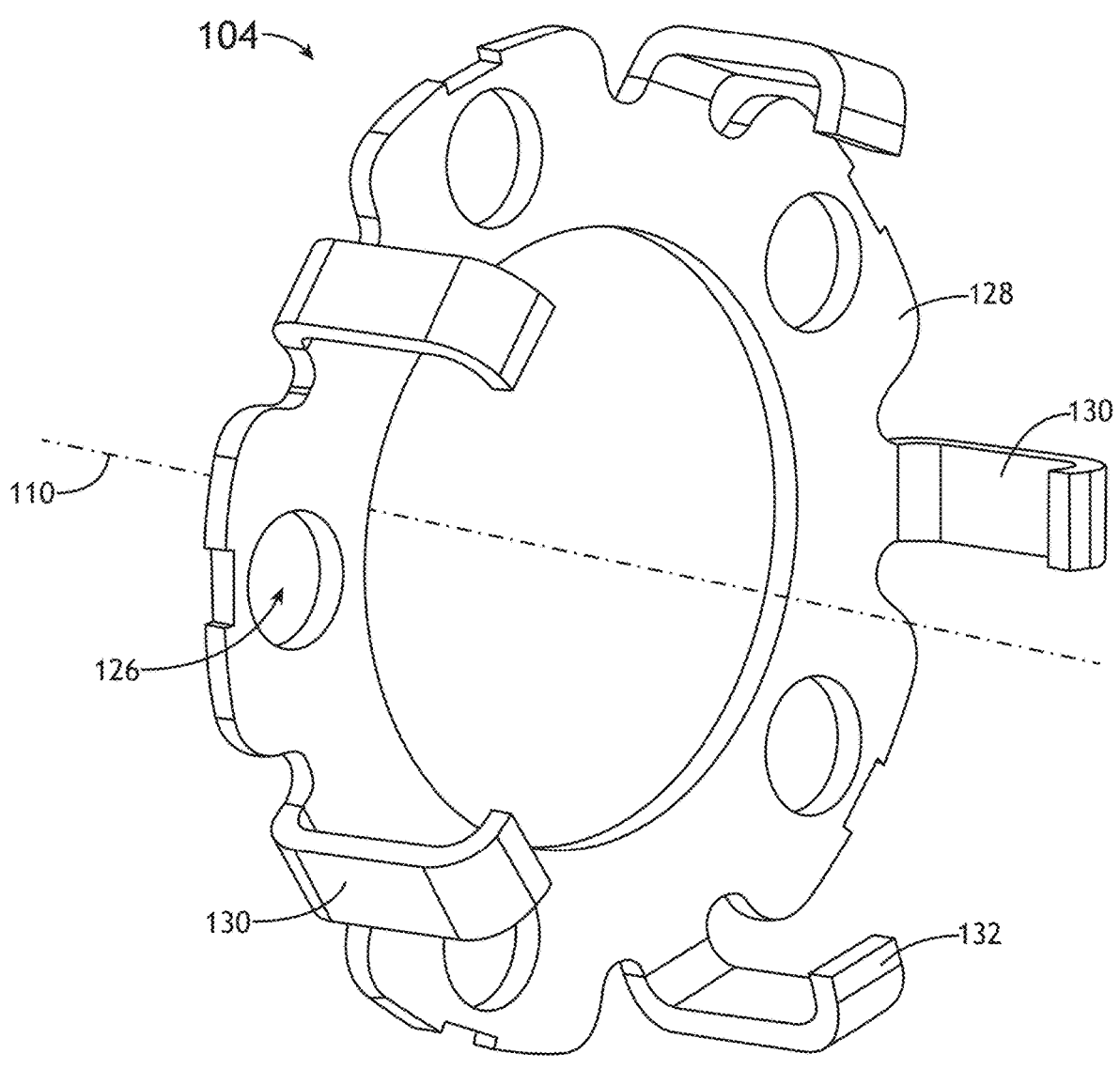
FIG. 3 depicts a perspective view of a planet gear carrier of the planet gear carrier assembly, in accordance with one or more embodiments of the present disclosure.

FIG. 3 depicts a non-limiting example of a planet gear carrier 104 according to an embodiment of the present disclosure. In embodiments, the planet gear carrier 104 may include a plate 128 (e.g., having a ring shape) having a plurality of axially extending arms 130. As shown, the plate 128 may include a plurality of through holes 126 that correspond in number and position to the through holes 126 provided in the base 102 such that, when the planet gear carrier 104 is turned to lock in place in the base 102, the through holes 126 through each of the base 102 and the planet gear carrier 104 align to receive the planet gear mounting pins 106 in an orientation perpendicular to the parallel planes of the base 102 and the plate 128.

In embodiments, the planet gear carrier 104 may be constructed from stamped metal to form the plate 128 and plurality of integrally formed and axially extending arms 130. In embodiments, each axially extending arm 130 may extend perpendicular to the plate 128 and terminate in a lateral portion 132 configured to interface with a respective one of the twist lock receivers 120. In embodiments, the plate through holes 126 may be spaced equidistant relative to each other and relative to the center axis 110, and the axially extending arms 130 may be spaced equidistant relative to each other and relative to the center axis 110, such that the plate 128 includes an alternating arrangement of equidistant spaced through holes 126 and axially extending arms 130. In embodiments, the number of axially extending arms 130 may correspond to the number of planet gears 108 such that each planet gear 108 is positioned between two adjacent axially extending arms 130 for strength and stability, among other advantages.

Figure 4:
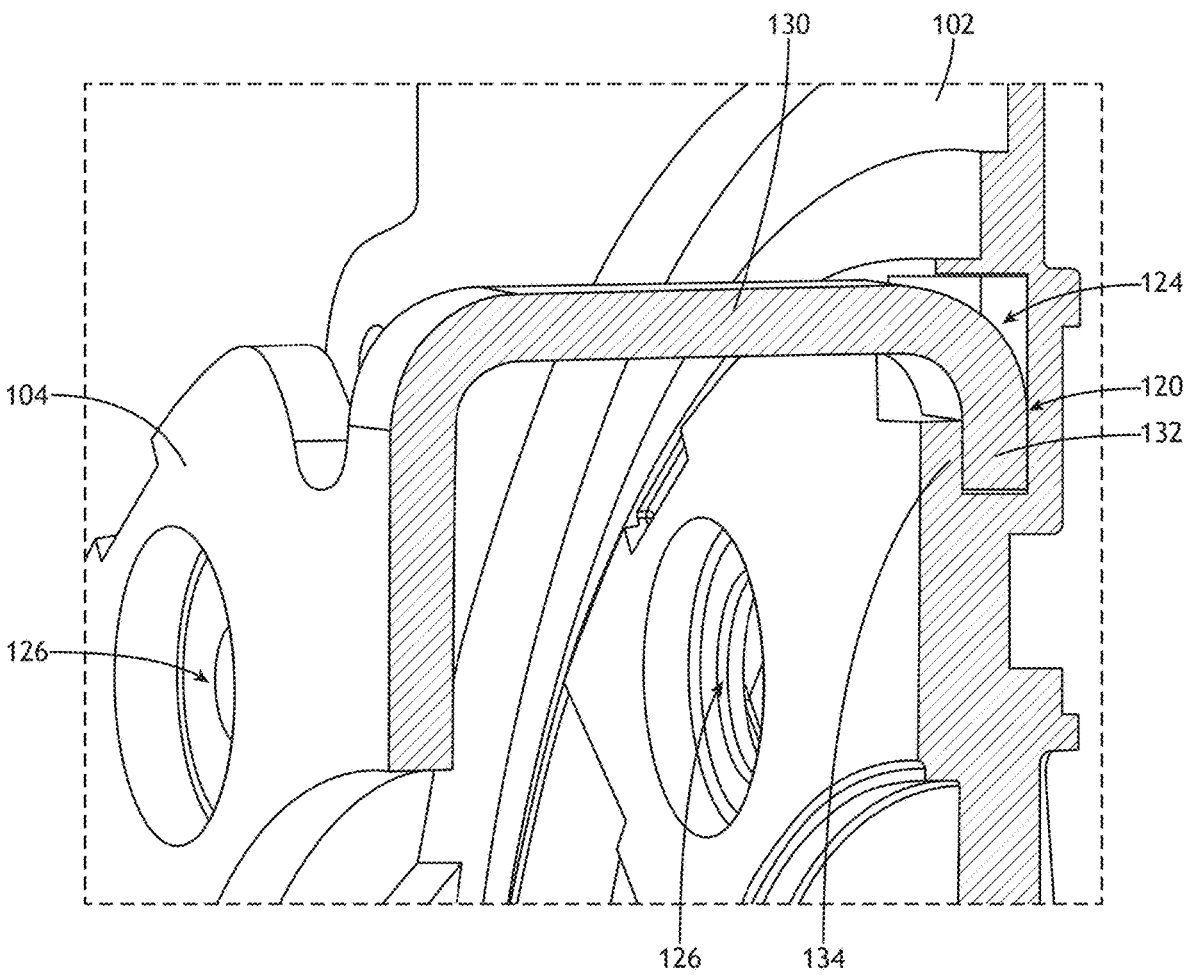
FIG. 4 depicts a cross-section of a twist lock interface mounting the planet gear carrier to the base, in accordance with one or more embodiments of the present disclosure.

FIG. 4 depicts an embodiment of the interface between one of the axially extending arms 130 engaged in a respective one of the twist lock receivers 120. When fully engaged in the twist lock receiver 120, the lateral portion 132 of the axially extending arm 130 may position below an undercut provided in the second portion 124 which forms a lateral overhang 134. In use, the second portion 124 of the twist lock receiver 120 and lateral overhang 134 constrain respective rotational and axial motions of the engaged axially extending arm 130. When installed, the planet gear mounting pins 106 mounted in the aligned through holes 126 formed in the base 102 and planet gear carrier 104 further constrain rotational motion of the planet gear carrier 104 such that, when fully assembled, relative motion between the planet gear carrier 104 and the base 102 is prevented.

Figure 5:
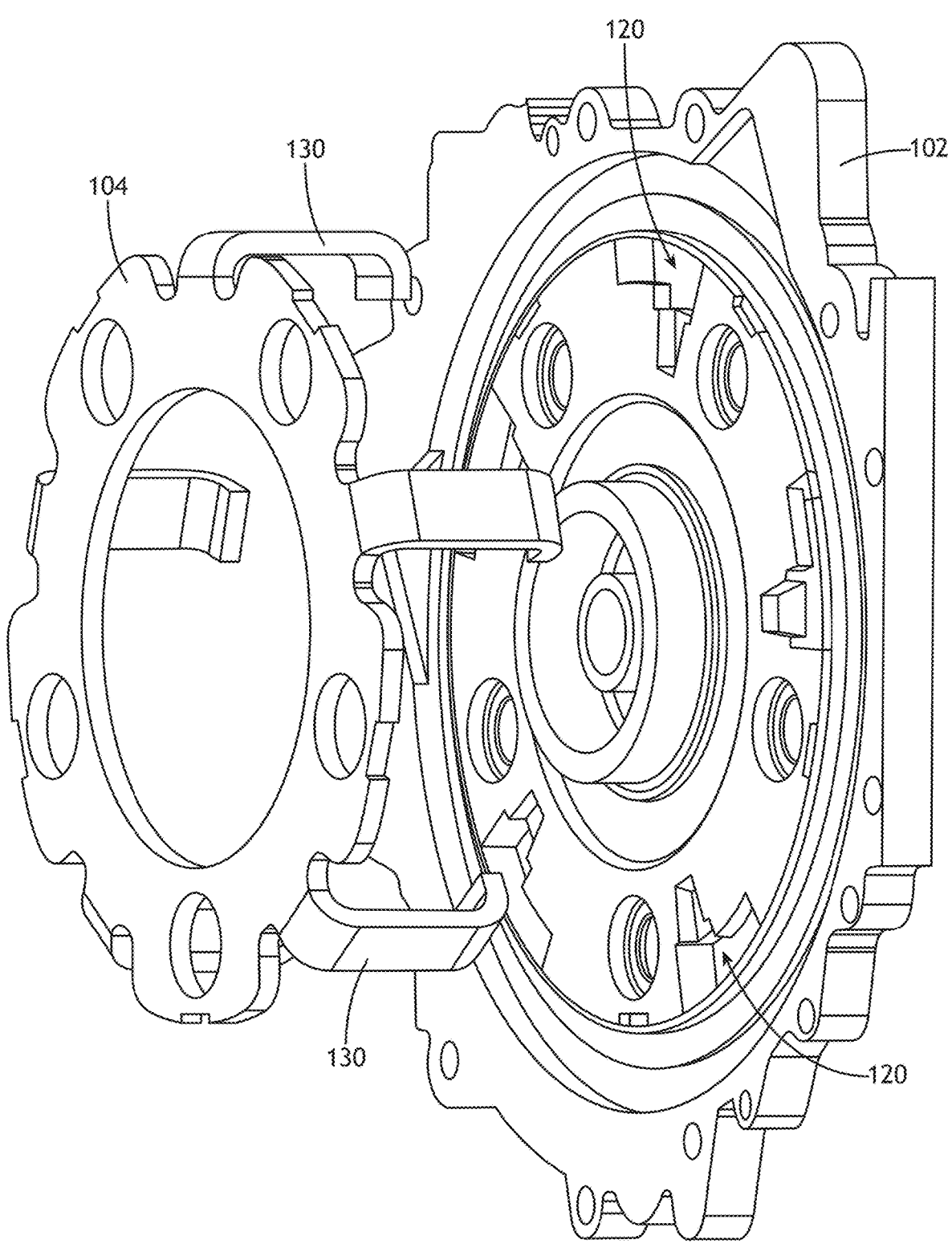
FIG. 5 depicts an exploded view of the planet gear carrier assembly, in accordance with one or more embodiments of the present disclosure.

FIG. 5 depicts the disassembled state of the planet gear carrier 104 and the base 102. As shown, the number and positions of the axially extending arms 130 corresponds to the number and positions of the twist lock receivers 120. To mount the planet gear carrier 104 to the base 102, the planet gear carrier 104 is moved in the axial direction until each terminal lateral portion 132 is received in its respective twist lock receiver 120. When all terminal lateral portions 132 are seated in their respective twist lock receiver 120, the planet gear carrier 104 is rotated or 'twisted' in one direction (e.g., counterclockwise as shown) to lock the axially extending arms 120 in place in their respective twist lock receiver 120. Once the planet gear carrier 104 is 'locked' to the base, the mounting pins 106 and respective planet gears 108 can be installed. In some embodiments, the planet gear mounting pins 106 (or portions thereof) and respective planet gears 108 may be mounted to the planet gear carrier 104 before mounting the planet gear carrier 104 to the base 102.

Figure 6:
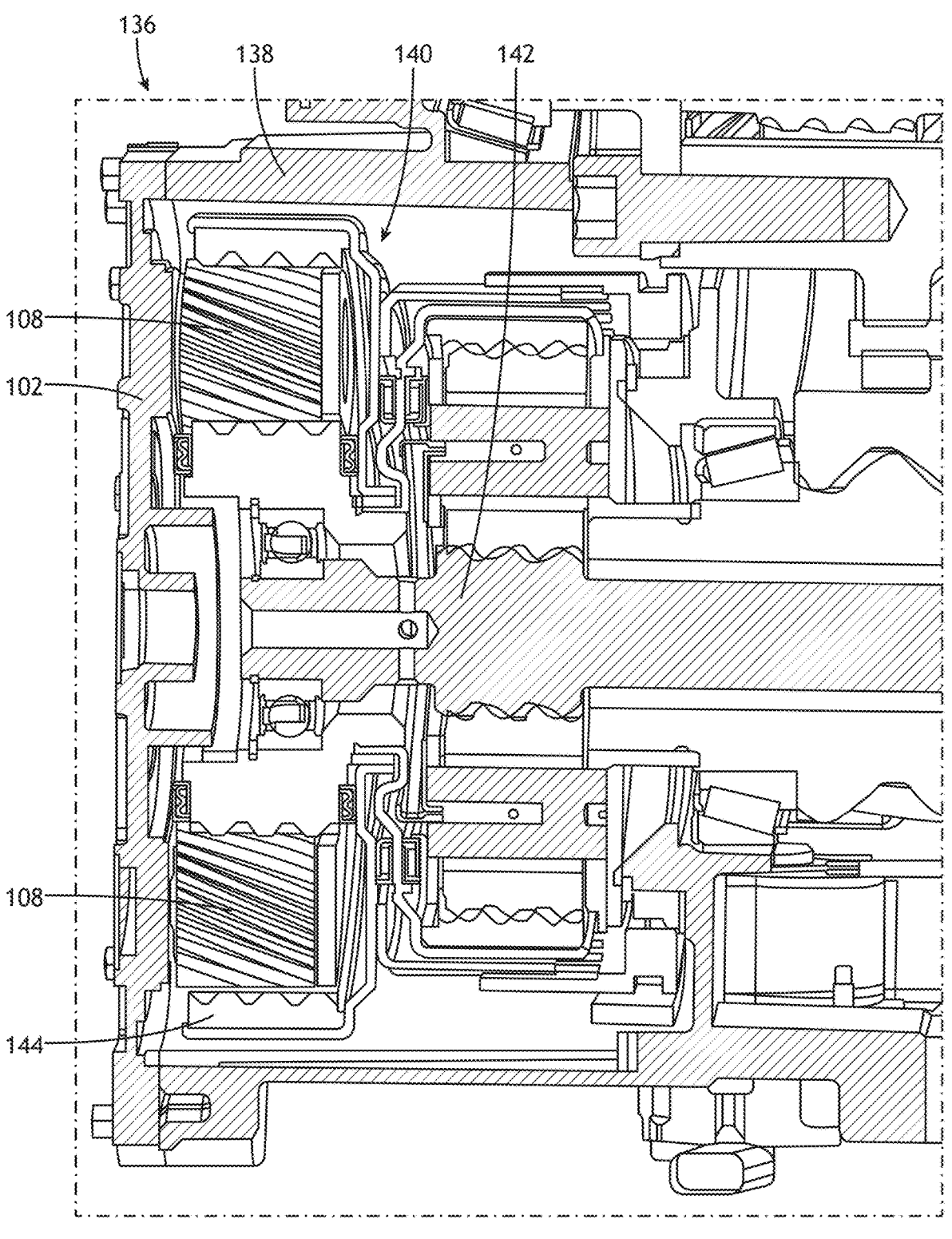
FIG. 6 depicts a cross-section of a gearbox including the planet gear carrier assembly, in accordance with one or more embodiments of the present disclosure.

FIG. 6 depicts a non-limiting example of a gearbox 136 including a housing 138 containing a planetary gearset 140 generally including the planet gear carrier assembly 100 described herein and including planet gears 108 meshed with an inner sun gear 142 and outer ring gear 144. As shown, the base 102 may be implemented as a cover mounted to the housing 108 to contain the planetary gearset 140 within the housing 108. In use, the sun gear 142 may be driven to transfer mechanical power to the ring gear 144 via the planet gears 108 in the case of a fixed planet gear carrier 104.

One skilled in the art will recognize that the herein described components operations, assemblies, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description and are not intended to designate an absolute frame of reference. Various modifications to the described embodiments will be apparent to those with skill in the art and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Planet gear carrier assembly
102 Base
104 Planet gear carrier
106 Planet gear mounting pins
108 Planet gears
110 Center axis
112 Sun gear groove
114 Annular bosses
116 Ring gear groove
118 Axially extending portions

7

120 Twist lock receiver
122 First portion
124 Second portion
126 Through holes
128 Plate
130 Axially extending arms
132 Lateral portion
134 Lateral overhang
136 Gearbox
138 Housing
140 Planetary gearset
142 Sun gear
144 Ring gear

What is claimed is:

1. A planet gear carrier assembly comprising:
   a base having a plurality of twist lock receivers arranged in a ring pattern; and
   a planet gear carrier including a plate having a plurality of axially extending arms corresponding in number and position to the plurality of twist lock receivers, the plurality of axially extending arms configured to twist lock engage in the plurality of twist lock receivers to removably mount the planet gear carrier to the base, each twist lock receiver including a first portion configured to axially receive one of the plurality of axially extending arms, and a second portion configured to axially and rotationally constrain the received one of the plurality of axially extending arms.

2. The planet gear carrier assembly of claim 1, wherein the base is constructed from die-casted aluminum and the planet gear carrier is constructed from stamped steel.

3. The planet gear carrier assembly of claim 1, wherein:
   the plurality of twist lock receivers are spaced equidistant relative to each other and relative to a central axis of the planet gear carrier assembly; and
   the plurality of axially extending arms are spaced equidistant relative to each other and relative to the central axis of the planet gear carrier assembly.

4. The planet gear carrier assembly of claim 1, wherein:
   the base and the planet gear carrier each include a plurality of through holes configured to receive planet gear mounting pins;
   each through hole of the base is positioned between two of the plurality of twist lock receivers; and
   each through hole of the planet gear carrier is positioned equidistant between two of the plurality of axially extending arms.

5. The planet gear carrier assembly of claim 1, wherein the second portion is continuous with the first portion and includes an undercut forming a lateral overhang.

6. The planet gear carrier assembly of claim 5, wherein each axially extending arm includes a terminal lateral portion configured to interface with the lateral overhang to constrain axial motion of the planet gear carrier relative to the base.

7. The planet gear carrier assembly of claim 1, wherein:
   the base includes a sun gear groove formed between a pair of concentric and axially extending annular bosses, the sun gear groove configured to provide clearance for a sun gear;
   the base includes a ring gear groove formed between axially extending portions of the base, the ring gear groove configured to provide clearance for a ring gear; and
   the ring gear groove is positioned on the base radially outward relative to the sun gear groove.

8

8. The planet gear carrier assembly of claim 1, further comprising:
   a plurality of planet gear mounting pins mounted between the base and the planet gear carrier; and
   a plurality of planet gears rotatably mounted on the plurality of planet gear mounting pins.

9. A planet gear carrier assembly comprising:
   a base including a plurality of twist lock receivers arranged in a ring pattern;
   a planet gear carrier removably mounted to the base, the planet gear carrier including a plate having a plurality of axially extending arms corresponding in number and position to the plurality of twist lock receivers, and the plurality of axially extending arms twist lock engaged with the plurality of twist lock receivers, each twist lock receiver including a first portion configured to axially receive one of the plurality of axially extending arms, and a second portion configured to axially and rotationally constrain the received one of the plurality of axially extending arms;
   a plurality of planet gear mounting pins mounted to and extending between the base and the planet gear carrier; and
   a plurality of planet gears rotatably mounted on the plurality of planet gear mounting pins.

10. The planet gear carrier assembly of claim 9, wherein the base is constructed from die-casted aluminum and the planet gear carrier is constructed from stamped steel.

11. The planet gear carrier assembly of claim 9, wherein:
   the plurality of twist lock receivers are spaced equidistant relative to each other and relative to a central axis of the planet gear carrier assembly; and
   the plurality of axially extending arms are spaced equidistant relative to each other and relative to the central axis of the planet gear carrier assembly.

12. The planet gear carrier assembly of claim 9, wherein:
   the base and the planet gear carrier each include a plurality of through holes configured to receive the plurality of planet gear mounting pins;
   each through hole of the base is positioned between two of the plurality of twist lock receivers; and
   each through hole of the planet gear carrier is positioned equidistant between two of the plurality of axially extending arms.

13. The planet gear carrier assembly of claim 9, wherein:
   the second portion is continuous with the first portion and includes an undercut forming a lateral overhang; and
   each axially extending arm includes a terminal lateral portion configured to interface with the lateral overhang to constrain axial motion of the planet gear carrier relative to the base.

14. The planet gear carrier assembly of claim 9, wherein:
   the base includes a sun gear groove formed between a pair of concentric and axially extending annular bosses, the sun gear groove configured to provide clearance for a sun gear;
   the base includes a ring gear groove formed between axially extending portions of the base, the ring gear groove configured to provide clearance for a ring gear; and
   the ring gear groove is positioned on the base radially outward relative to the sun gear groove.

15. A gearbox comprising:

a housing;

a sun gear disposed in the housing;

a ring gear disposed in the housing; and a planet gear carrier assembly comprising:

a cover mounted to the housing, the cover including a plurality of twist lock receivers arranged in a ring pattern;

a planet gear carrier disposed in the housing and removably mounted to the cover, the planet gear carrier including a plate having a plurality of axially extending arms corresponding in number and position to the plurality of twist lock receivers, and the plurality of axially extending arms twist lock engaged in the plurality of twist lock receivers, each twist lock receiver including a first portion configured to axially receive one of the plurality of axially extending arms, and a second portion configured to axially and rotationally constrain the received one of the plurality of axially extending arms;

a plurality of planet gear mounting pins mounted to and extending between the cover and the planet gear carrier; and a plurality of planet gears rotatably mounted on the plurality of planet gear mounting pins, each planet gear meshed with the sun gear and the ring gear.

16. The gearbox of claim 15, wherein the cover is constructed from die-casted aluminum and the planet gear carrier is constructed from stamped steel.

17. The gearbox of claim 15, wherein:

the cover and the planet gear carrier each include a plurality of through holes configured to receive the plurality of planet gear mounting pins;

each through hole of the cover is positioned between two of the plurality of twist lock receivers; and each through hole of the planet gear carrier is positioned equidistant between two of the plurality of axially extending arms.

18. The gearbox of claim 15, wherein:

the second portion is continuous with the first portion and includes an undercut forming a lateral overhang; and each axially extending arm includes a terminal lateral portion configured to interface with the lateral overhang to constrain axial motion of the planet gear carrier relative to the cover.

\* \* \* \* \*